(12) United States Patent
Nakamura

(10) Patent No.: US 11,196,294 B2
(45) Date of Patent: Dec. 7, 2021

(54) POWER MANAGEMENT METHOD, POWER MANAGEMENT SERVER, LOCAL CONTROL APPARATUS, AND POWER MANAGEMENT SYSTEM

(71) Applicant: KYOCERA Corporation, Kyoto (JP)

(72) Inventor: Kazutaka Nakamura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/463,850

(22) PCT Filed: Nov. 28, 2017

(86) PCT No.: PCT/JP2017/042588
§ 371 (c)(1),
(2) Date: May 24, 2019

(87) PCT Pub. No.: WO2018/097309
PCT Pub. Date: May 31, 2018

(65) Prior Publication Data
US 2019/0341807 A1 Nov. 7, 2019

(30) Foreign Application Priority Data
Nov. 28, 2016 (JP) .............................. JP2016-230453

(51) Int. Cl.
*H02J 13/00* (2006.01)
*H02J 3/14* (2006.01)
*G06Q 50/06* (2012.01)

(52) U.S. Cl.
CPC ............ *H02J 13/0013* (2013.01); *H02J 3/14* (2013.01); *G06Q 50/06* (2013.01)

(58) Field of Classification Search
CPC .... H02J 13/0013; H02J 3/14; H02J 13/00032; H02J 13/00; G06Q 50/06
See application file for complete search history.

(56) References Cited

U.S. PATENT DOCUMENTS

| 9,977,449 | B2* | 5/2018 | Nakamura | G05B 15/02 |
|---|---|---|---|---|
| 2003/0011486 | A1* | 1/2003 | Ying | H02J 13/0075 340/12.52 |
| 2003/0020333 | A1* | 1/2003 | Ying | H02J 13/00036 307/38 |
| 2005/0207081 | A1* | 9/2005 | Ying | H02J 13/00034 361/105 |
| 2010/0274366 | A1* | 10/2010 | Fata | G06F 11/3048 700/7 |

(Continued)

FOREIGN PATENT DOCUMENTS

| JP | 2013-169104 A | 8/2013 |
|---|---|---|
| JP | 2014-128107 A | 7/2014 |
| JP | 2015-22560 A | 2/2015 |

*Primary Examiner* — Ziaul Karim
(74) *Attorney, Agent, or Firm* — Hauptman Ham, LLP

(57) ABSTRACT

A power management method according is provided with a step A of sending a control message from a power management server to a local control apparatus and a step B of performing, on the basis of source identification information that identifies a source of the control message, by the local control apparatus, control based on the control message. The source identification information is associated with a use type that identifies use of the control message.

9 Claims, 6 Drawing Sheets

(56) References Cited

U.S. PATENT DOCUMENTS

| | | | |
|---|---|---|---|
| 2011/0004358 A1* | 1/2011 | Pollack | B60L 53/65 700/297 |
| 2014/0277788 A1* | 9/2014 | Forbes, Jr. | G05B 15/02 700/286 |
| 2014/0289321 A1* | 9/2014 | Fata | H04L 12/2818 709/203 |
| 2014/0309799 A1 | 10/2014 | Ise et al. | |
| 2014/0324193 A1* | 10/2014 | Kitaji | G05B 15/02 700/22 |
| 2015/0207328 A1* | 7/2015 | Nakamura | H01M 16/006 307/153 |
| 2016/0286627 A1* | 9/2016 | Chen | H05B 47/105 |

* cited by examiner

FIG. 4

| SOURCE IDENTIFICATION INFORMATION | USE TYPE | | PRIORITY LEVEL INFORMATION |
|---|---|---|---|
| | ISSUER | PURPOSE | |
| AAAA | COMPANY | POWER FLOW CONTROL | B |
| BBBB | | REVERSE POWER FLOW CONTROL | A |
| CCCC | | VPP CONTROL | C |
| DDDD | USER | -- | A | ns # POWER MANAGEMENT METHOD, POWER MANAGEMENT SERVER, LOCAL CONTROL APPARATUS, AND POWER MANAGEMENT SYSTEM

RELATED APPLICATIONS

The present application is a National Phase of International Application No. PCT/JP2017/042588, filed Nov. 28, 2017, and claims priority based on Japanese Patent Application No. 2016-230453, filed Nov. 28, 2016.

TECHNICAL FIELD

The present invention is a technique relating to a power management method, a power management server, a local control apparatus, and a power management system.

BACKGROUND ART

Nowadays, in order to maintain the power demand and supply balance of a power grid, there is known a technique that suppresses the power flow rate from a power grid to a facility or a reverse amount flow from the facility to the power grid (e.g. Patent Literatures 1 and 2). Specifically, a control message is sent from a power management server to a local control apparatus, and hence the power flow rate or the reverse power flow rate is suppressed.

CITATION LIST

Patent Literature

Patent Literature 1: Japanese Application Publication No. 2013-169104 A
Patent Literature 2: Japanese Application Publication No. 2014-128107 A

SUMMARY OF INVENTION

A power management method according to a first aspect is provided with a step A of sending a control message from one or more power management servers configured to manage a facility connected to a power grid, to a local control apparatus provided on the facility and a step B of performing, on the basis of source identification information that identifies a source of the control message, by the local control apparatus, control based on the control message. The source identification information is associated with a use type that identifies use of the control message.

A power management server according to a second aspect is a server configured to manage a facility connected to a power grid. The power management server is provided with a transmitter configured to send a control message to a local control apparatus provided on the facility. The source identification information that identifies a source of the control message is associated with a use type that identifies use of the control message.

A local control apparatus according to a third aspect is provided on a facility connected to a power grid. The local control apparatus is provided with a receiver configured to receive a control message from a power management server configured to manage the facility and a controller configured to perform, on the basis of source identification information that identifies a source of the control message, control based on the control message. The source identification information is associated with a use type that identifies use of the control message.

A power management system according to a forth aspect is provided with a power management server configured to manage a facility connected to a power grid and a local control apparatus provided on the facility. The power management sever includes a transmitter configured to send a control message to the local control apparatus. The local control apparatus includes a controller configured to perform, on the basis of source identification information that identifies a source of the control message, control based on the control message. The source identification information is associated with a use type that identifies use of the control message.

BRIEF DESCRIPTION OF DRAWINGS

FIG. 4 is a diagram of the correspondence between source identification information and a priority level information according to an embodiment.

DESCRIPTION OF EMBODIMENTS

The control message described in Background Art includes information elements that specify specific control content, such as an information element that specifies the suppression amount of a power flow to be suppressed and an information element that specifies the amount of a reverse power flow to be suppressed.

However, the control message includes no information element that specifies information (a use type) for identifying the use of the control message, and hence there is no material for the local control apparatus to determine whether to execute the control message.

Here, the use type of the control message is information that indicates purposes (control relating to the power flow rate, control relating to the reverse power flow rate, and control relating to a virtual power plant (VPP), for example) implemented by control based on the control message or an issuer that plans control based on the control message (a user or a power company, for example), for example.

Therefore, the present disclosure is to provide a power management method, a power management server, a local control apparatus, and a power management system that can appropriately control the control content specified by a control message.

In the following, an embodiment will be described with reference to the drawings. Note that in the following description of the drawings, the same or similar parts are designated with the same or similar reference signs.

However, note that the drawings are schematic, and the ratio of dimensions, for example, are sometimes different from the actual dimensions. Therefore, determination has to be made on specific dimensions, for example, taking into account of the following description. The drawings of course include parts with the different relationship or the different ratio between dimensions.

Embodiment

Power Management System

In the following, a power management system according to an embodiment will be described.

Figure 1:
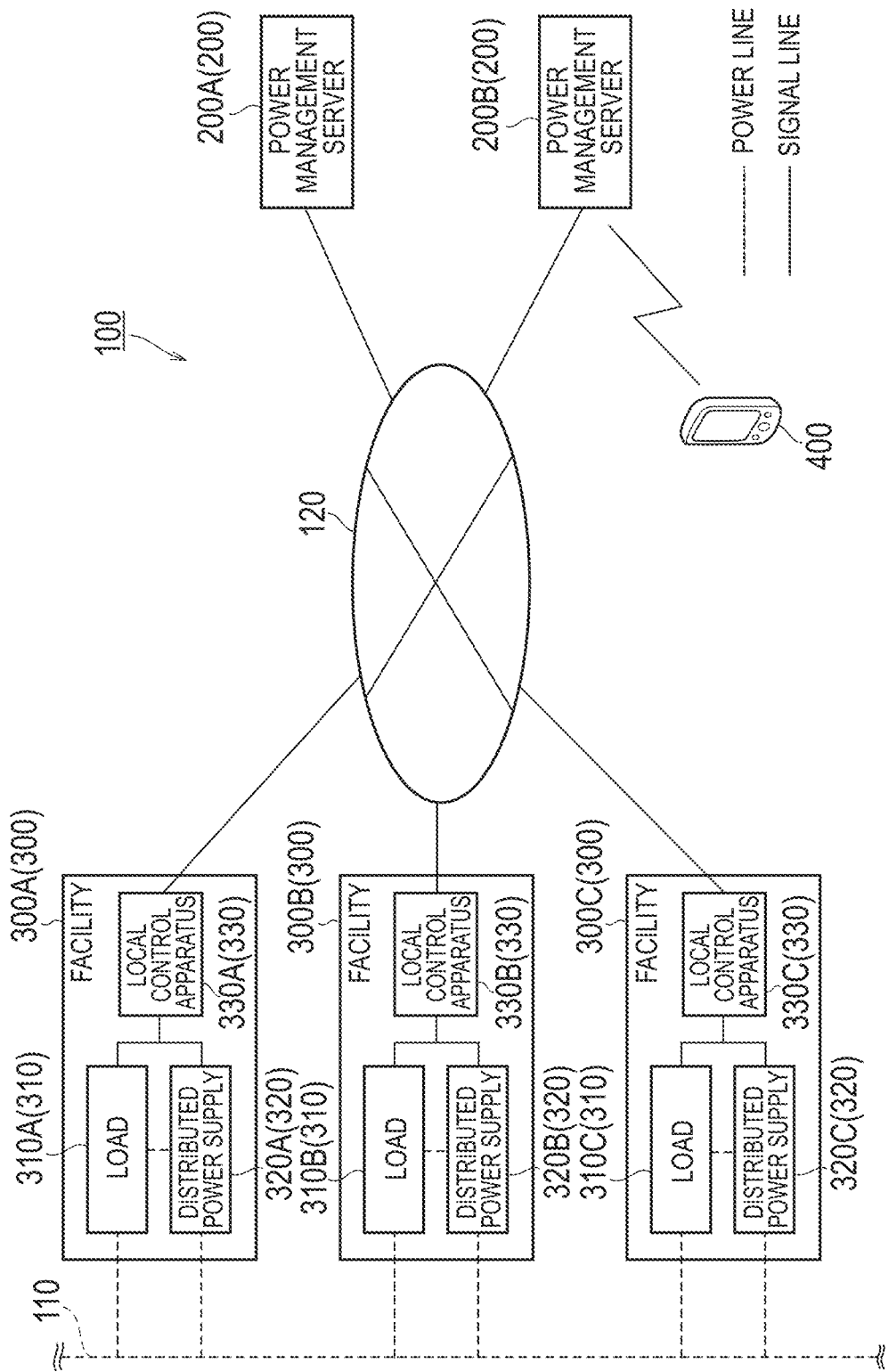
FIG. 1 is a diagram of a power management system 100 according to an embodiment.

As shown in FIG. 1, a power management system 100 has a power management server 200, a facility 300, and a user terminal 400. In FIG. 1, as an example of the facility 300, facilities 300A to 300C are shown.

Each of the facilities 300 is connected to a power grid 110. In the following, a flow of power from the power grid 110 to the facility 300 is referred to as a power flow, and a flow of power from the facility 300 to the power grid 110 is referred to as a reverse power flow.

The power management server 200 and the facility 300 are connected to a network 120. The network 120 only has to provide circuits between the power management server 200 and the facility 300. The network 120 is the Internet, for example. The network 120 may provide a dedicated circuit, such as a virtual private network (VPN).

The power management server 200 is a server managed by companies, such as a power company, power distribution company, or retail company.

The power management server 200 sends, to a local control apparatus 330 provided on the facility 300, a control message that instructs control of an equipment (a load 310 or a distributed power supply 320) provided on the facility 300 (step A). The instruction that controls the equipment may be an instruction that requests a report of information on the equipment or may be an instruction that requests the setting of the operating state of the equipment.

The instruction that requests a report of information on the equipment is performed is performed by specifying the information element indicating information on one or more equipments to which a report is requested by the power management server 200. Examples of such an information element include the use amount of power of one or more loads 310 (Wh), the history of the use amount of power of one or more loads 310 (Wh), the generated energy of the distributed power supply 320 (W), the charge remaining amount of a rechargeable battery that is an example of the distributed power supply 320 (Wh), the charging and discharging power of the rechargeable battery (W), the amount of charging and discharging power of the rechargeable battery (Wh), the history of the amount of charging and discharging power of the rechargeable battery (Wh), the possible quantity of charging and discharging the rechargeable battery (Wh), the possible quantity of suppressing the power flow rate (W), the possible quantity of suppressing the reverse power flow rate (W), alive information indicating whether the equipment is operated, and the operating state of a power conditioning system (PCS) configuring the distributed power supply 320.

The instruction that requests the setting of the operating state of the equipment is performed by specifying the information element indicating the operating state of one or more equipments to which settings to the equipment are requested. Examples of such an information element include an increase or decrease in power used by one or more loads 310 (Wh), an increase or decrease in generated energy by the distributed power supply 320 (Wh), an increase or decrease in discharge power by the rechargeable battery (Wh), and an increase or decrease in charge power in the rechargeable battery (Wh).

The power management server 200 may send a power flow control message that requests control of the power flow (e.g. DR, Demand Response) as the instruction that requests the setting of the operating state of the equipment, or may send a reverse power flow control message that requests control of the reverse power flow. The power management server 200 may send a power supply control message that controls the operating state of the distributed power supply 320 as the instruction that requests the setting of the operating state of the equipment. The degree of control of the power flow or the reverse power flow may be expressed by the absolute value (e.g. xx kW), or may be expressed by the relative value (e.g. xx %). Alternatively, the degree of control of the power flow or the reverse power flow may be expressed by two or more levels. The degree of control of the power flow or the reverse power flow may be expressed by the power rate (RTP, Real Time Pricing) determined by the present power demand and the supply balance, or may be expressed by the power rate (TOU, Time Of Use) determined by the past power demand and the supply balance.

In the embodiment, as the power management server 200, a power management server 200A and a power management server 200B are shown as an example. The power management servers 200A and 200B implement a function that issues a power flow control message (in the following, a power flow control function), a function that issues a reverse power flow control message (in the following, a reverse power flow control function), and a function that issues a power supply control message (in the following, a VPP control function). The power management servers 200A and 200B may implement a function (a relay control function) that relays a control message sent from the user terminal 400, described later, to the local control apparatus 330. The power flow control function, the reverse power flow control function, the VPP control function, and the relay control function only have to be virtually implemented. Therefore, these functions may be physically implemented by one power management server 200, for example, or may be physically implemented by two or more power management servers 200.

The facility 300 has the load 310, the distributed power supply 320, and the local control apparatus 330. The load 310 is an equipment that consumes power. The load 310 may be an air-conditioning equipment, or a lighting equipment, for example. The distributed power supply 320 is an equipment having at least any one of the function that outputs power and the function that accumulates power. The distributed power supply 320 may be a solar cell or a fuel cell or a rechargeable battery, for example. The distributed power supply 320 may be a power supply used for a virtual power plant (VPP). The local control apparatus 330 is a device that manages the power of the facility 300 (EMS, Energy Management System). The local control apparatus 330 may control the operating state of the load 310, or may control the operating state of the distributed power supply 320 provided on the facility 300.

In the embodiment, the communication between the power management server 200 and the local control apparatus 330 is performed in conformance to a first protocol. On the other hand, the communication between the local control apparatus 330 and the equipment (the load 310 or the distributed power supply 320) is performed in conformance to a second protocol different from the first protocol. Examples of the first protocol that can be used include a protocol in conformance to Open Automated Demand Response (ADR) or a unique and dedicated protocol. Examples of the second protocol that can be used include a protocol in conformance to ECHONET Lite, SEP (Smart Energy Profile) 2.0, KNX, or a unique and dedicated protocol. Note that the first protocol and the second protocol only have to be different from each other. For example, even though both protocols are a unique and dedicated protocols, the protocols only have to be protocols created in conformance to different rules.

The user terminal 400 is a terminal owned by a user related to the facility 300. The user terminal 400 is a personal computer, smartphone or tablet terminal, for example. The user related to the facility 300 is not limited specifically. However, the user may be the administrator of the facility 300 or may be the user of the facility 300. Similarly to the power management server 200, the user terminal 400 sends a control message that instructs control of the equipment (the load 310 or the distributed power supply 320) provided on the facility 300. The types of control messages sent by the user terminal 400 may be the same as the types of control messages sent by the power management server 200, or may be different from the types of control messages sent by the power management server 200.

Power Management Server

Figure 2:
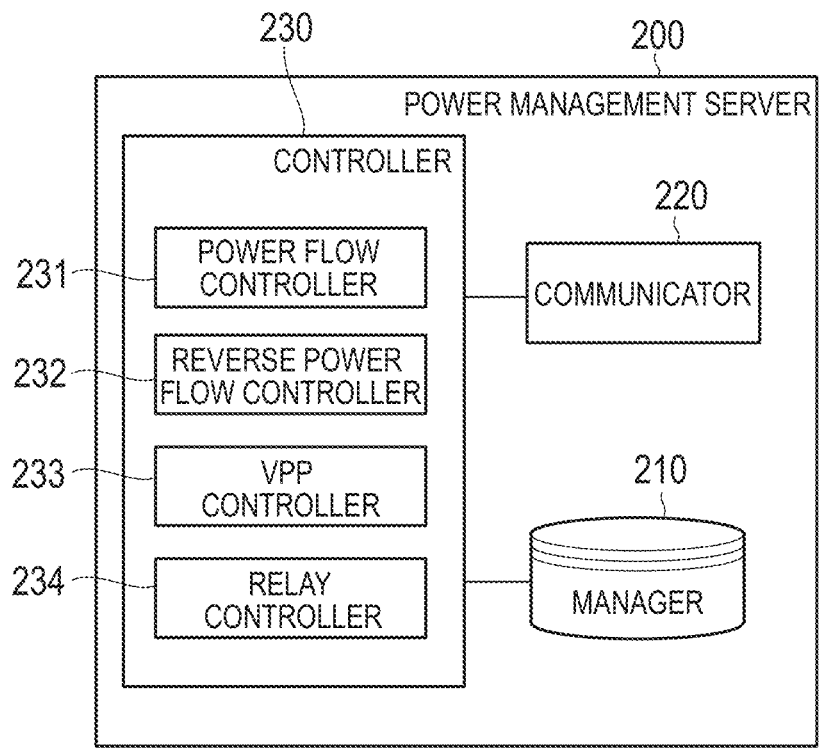
FIG. 2 is a diagram of a power management server 200 according to an embodiment.

In the following, according to the embodiment the power management server will be described. As shown in FIG. 2, the power management server 200 has a manager 210, a communicator 220, and a controller 230. The power management server 200 is an example of Virtual Top Node (VTN).

The manager 210 configured of a storage medium, such as a non-volatile memory or/and a hard disk drive (HDD), and manages data related to the facility 300. Examples of the data related to the facility 300 include types of the equipment (the load 310 or the distributed power supply 320) provided on the facility 300 and the specification of the equipment (the load 310 or the distributed power supply 320) provided on the facility 300. The specification may be the rated power consumption of the load 310 and the rated output power of the distributed power supply 320, for example.

The communicator 220 is configured of communication modules, and communicates with the local control apparatus 330 via the network 120. As described above, the communicator 220 communicates in conformance to the first protocol. For example, the communicator 220 sends a first message to the local control apparatus 330 in conformance to the first protocol. The communicator 220 receives a first message response from the local control apparatus 330 in conformance to the first protocol.

The controller 230 is configured of a memory and a central processing unit (CPU), for example, and controls the configurations provided on the power management server 200. The controller 230 instructs the local control apparatus 330 provided on the facility 300 to control the equipment (the load 310 or the distributed power supply 320) provided on the facility 300, for example.

Here, the controller 230, has, for example, a power flow controller 231 that implements the power flow control function, a reverse power flow controller 232 that implements the reverse power flow control function, a VPP controller 233 that implements the VPP control function, and a relay controller 234 that implements the relay control function. Here, the case is shown as an example in which one power management server 200 physically has the power flow controller 231, the reverse power flow controller 232, the VPP controller 233, and the relay controller 234. However, the embodiment is not limited to this. As described above, since the power flow control function, the reverse power flow control function, the VPP control function, and the relay control function only have to be virtually implemented, the power flow controller 231, the reverse power flow controller 232, the VPP controller 233, and the relay controller 234 may be provided on two or more power management servers 200.

Under such a premise, the power flow controller 231, the reverse power flow controller 232, the VPP controller 233, and the relay controller 234 use source identification information different from each other as source identification information that identifies the source of the control message. That is, the source identification information is associated with the use type that identifies the use of the control message. The source identification information may be a global IP address in conformance to IPv4 or IPv6, for example.

Here, the use type indicates at least any of a purpose implemented by control based on the control message and an issuer that plans control based on the control message. For example, the use type indicates at least any one of control of the power flow rate to the power grid 110 to the facility 300 (power flow control), control of the reverse power flow rate to the facility 300 to the power grid 110 (reverse power flow control), control of the distributed power supply 320 provided on the facility 300 (VPP control), and, control from the user related to the facility 300 (relay control).

In the embodiment, in the first protocol, the information element that specifies the use type may not be defined. That is, the message format in conformance to the first protocol may include the information element that specifies the control content to the local control apparatus 330, without including the information element that specifies the use type.

For example, the power flow control may be control according to a demand response that instructs the suppression of the power flow rate (the energy saving control of the load 310 and the output increase control of the distributed power supply 320, for example). The reverse power flow control may be the suppression control of the output of the solar cell that is one of the distributed power supply 320. The VPP control may be the charge control or discharge control of the rechargeable battery that is one of the distributed power supply 320, or may be the starting time of the fuel cell (e.g. PEFC) that is one of the distributed power supply 320 and boiling control of a heat pump installed together with the PEFC. The relays control is control that relays messages that instruct the control of the load 310 optionally control by the user (turning on and off the power supply of an air conditioner, changing the set temperature of the air conditioner, setting boiling of the heat pump, for example).

Here, in the case in which the power flow control is the energy saving control of the air conditioner and the VPP control is the charge control of the rechargeable battery, the case is considered in which these types of control simultaneously occur. In this case, energy saving control conflicts with charge control. However, the local control apparatus 330 fails to determine whether to perform which control unless otherwise the use of the control message is known. In the embodiment, the local control apparatus 330 can grasp the use of the control message from the source identification information. Thus, the power grid 110 can be stabilized by performing energy saving control without performing charge control, for example.

Alternatively, in the case in which the reverse power flow control is the forward scheduling control of the boiling time of the heat pump and the VPP control is the discharge control of the rechargeable battery, the case in which these types of control simultaneously occur is considered. In this case, the forward scheduling control of boiling time conflicts with discharge control. However, the local control apparatus 330 fails to determine whether to perform which control unless otherwise the use of the control message is known. In the embodiment, the local control apparatus 330 can grasp the use of the control message from the source identification information. Thus, the power grid 110 can be stabilized by performing the forward scheduling control of the boiling time of the heat pump without performing discharge control, for example.

Alternatively, in the case in which the reverse power flow control is the suppression control of the output of the solar cell and the VPP control is the discharge control of the rechargeable battery, the case in which these types of control simultaneously occur is considered. In this case, the output suppression control conflicts with the discharge control. However, the local control apparatus 330 fails to determine whether to perform which control unless otherwise the use of the control message is known. In the embodiment, the local control apparatus 330 can grasp the use of the control message from the source identification information. Thus, the power grid 110 can be stabilized by performing the output suppression control without performing the discharge control, for example.

Note that also in the case in which the output suppression control does not conflict with the discharge control, the local control apparatus 330 can grasp the use of the control message from the source identification information, and hence the local control apparatus 330 can determine whether to perform which control.

For example, in the case in which the power flow control is the energy saving control of the air conditioner and the VPP control is the discharge control of the rechargeable battery, the case in which these types of control simultaneously occur is considered. In this case, energy saving control does not conflict with discharge control. However, the local control apparatus 330 fails to determine whether to perform which control in priority unless otherwise the use of the control message is known. In the embodiment, the local control apparatus 330 can grasp the use of the control message from the source identification information. Thus, a greater incentive can be obtained by performing energy saving control, for example, without performing discharge control depending on the level of incentives.

Local Control Apparatus

Figure 3:
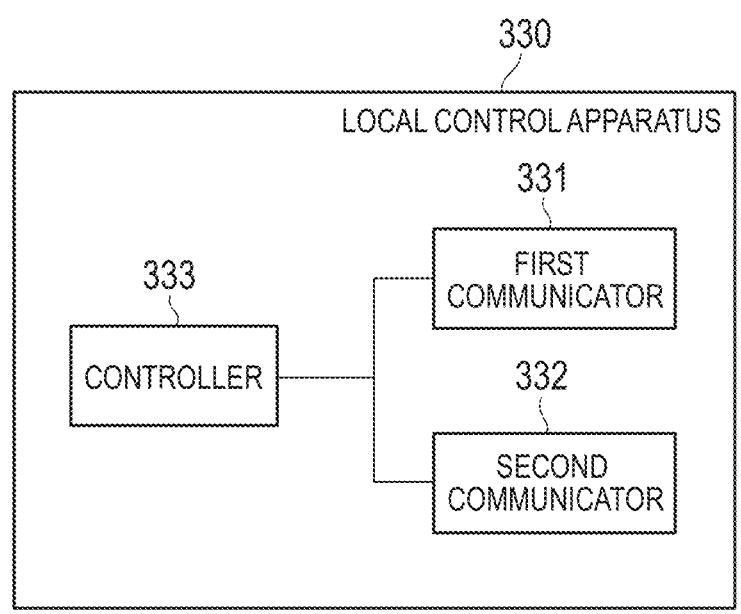
FIG. 3 is a diagram of a local control apparatus 330 according to an embodiment.

In the following, according to the embodiment the local control apparatus will be described. As shown in FIG. 3, the local control apparatus 330 has a first communicator 331, a second communicator 332, and a controller 333. The local control apparatus 330 is an example of Vertual End Node (VEN).

The first communicator 331 is configured of communication modules, and communicates with the power management server 200 via the network 120. As described above, the first communicator 331 communicates in conformance to the first protocol. For example, the first communicator 331 receives the first message from the power management server 200 in conformance to the first protocol. The first communicator 331 sends the first message response to the power management server 200 in conformance to the first protocol.

The second communicator 332 is configured of communication modules, and communicates with the equipment (the load 310 or the distributed power supply 320). As described above, the second communicator 332 communicates in conformance to the second protocol. For example, the second communicator 332 sends the second message to the equipment in conformance to the second protocol. The second communicator 332 receives a second message response from the equipment in conformance to the second protocol.

The controller 333 is configured of a memory and a CPU, for example, and controls the configurations provided on the local control apparatus 330. Specifically, in order to manage the power of the facility 300, the controller 333 instructs the equipment to report information on the equipment by sending the second message and by receiving the second message response. In order to control the power of the facility 300, the controller 333 instructs the equipment to set the operating state of the equipment by sending the second message.

In the embodiment, the controller 333 instructs the second communicator 332 to send the second message including the information element of the second protocol corresponding to the information element of the first protocol, according to the control content to the equipment instructed by the first message.

(1) Case in which the control content to the equipment instructed by the first message is the report of information on the equipment In this case, the first message response including the information element fitting the first protocol has to be sent to the power management server 200. Therefore, the controller 333 converts the information element included in the second message response into the information element fitting the first protocol. The conversion of the information element may be automatically performed at the local control apparatus 330, or may be performed through user manipulation and approval. The controller 333 instructs the first communicator 331 to send a first message response including the converted information element.

Here, sending the second message and receiving the second message response may be performed before the reception of the first message. In this case, the controller 333 instructs the first communicator 331 to send the first message response based on the information on the equipment managed at the controller 333 before the reception of the first message. The information on the equipment managed at the controller 333 is information on the equipment obtained from the information element included in the second message response received from the equipment before the reception of the first message.

Alternatively, sending the second message and receiving the second message response may be performed after the reception of the first message. In this case, the controller 333 selects the information element fitting to the second protocol based on the information element specified by the first message. The controller 333 instructs the second communicator 332 to send the second message including the selected information element. The controller 333 instructs the first communicator 331 to send the first message response based on the information on the equipment managed at the controller 333 after the reception of the second message response. The information on the equipment managed at the controller 333 is information on the equipment obtained from the information element included in the second message response received from the equipment after the reception of the first message.

The case is assumed in which the information element fitting the first protocol has no one to one correspondence with the information element included in the second message response. For example, the case is considered in which the unit of the information element fitting the first protocol is different from the unit of the information element included in the second message response. Alternatively, the case is considered in which the information element fitting the first protocol is only expressed by two or more information elements included in the second message response. In this case, the controller 333 computes the information element fitting the first protocol based on the information element included in the second message response. For example, the controller 333 may compute the information element expressed by alternating current power based on the information element expressed by direct current power. The controller 333 may compute the information element expressed by the power amount per unit time based on the information element expressed by instantaneous power. The controller 333 may compute one information element based on two or more information elements.

(2) Case in which the control content to the equipment instructed by the first message is the setting of the operating state of the equipment In this case, the local control apparatus 330 selects one or more information elements corresponding to the information element specified by the first message from information elements that the equipment can follow in conformance to the second protocol. The local control apparatus 330 sends a message including the selected information element as a second message to the equipment.

In the embodiment, the controller 333 performs, on the basis of source identification information, control based on the control message (step B). For example, the controller 333 manages information that associates priority level information indicating the priority level to execute the control message with source identification information (step C). These pieces of information are pieces of information shown in FIG. 4, for example.

As shown in FIG. 4, the controller 333 manages information that associates source identification information with the use type and the priority level information. However, the use type may be implicitly associated with the source identification information. In this case, the controller 333 does not necessarily manage the information that associates the source identification information with the use type.

The controller 333 performs, on the basis of the priority level information, control based on the control message. For example, in the case in which the purpose of control implemented by the control message is the reverse power flow control, the controller 333 may perform control based on the control message regardless of the power management state of the facility 300. Similarly, in the case in which the issuer that plans control implemented by the control message is a user, the controller 333 may perform control based on the control message regardless of the power management state of the facility 300. On the other hand, in the case in which the purpose of control implemented by the control message is the power flow control or the VPP control, the controller 333 determines whether to perform control based on the control message on the basis of the power management state of the facility 300 and incentives in association with the execution of the power flow control or the VPP control. The power management state is the operating state of the load 310 and the power generating state (or the power storing state) of the distributed power supply 320.

In the embodiment, in the case in which control based on the control message is not performed, the controller 333 notifies the power management server 200 that control based on the control message is not performed. For example, the notification that control based on the control message is not performed is performed by the message (the first message response) in conformance to the first protocol. That is, the controller 333 instructs the first communicator 331 to send the first message response including the information element indicating that control based on the control message is not performed.

The timing of notifying that control based on the control message is not performed may be the timing of determining that control based on the control message is not performed, or may be the timing designated as the timing of performing control based on the control message. For example, the timing of performing is designated by the control message. For the control message, the absolute time instant may be designated as the timing of performing, or relative time instant to sending time (or reception time) of the control message may be designated as the timing of performing.

Power Management Method

In the following, the power management method according to the embodiment will be described. In the following, the case is shown as an example in which the first protocol is a protocol in conformance to Open ADR2.0 and the second protocol is a protocol in conformance to ECHONET Lite. The sequence relating to the case will be described in which the control content to the equipment instructed by the first message is the setting of the operating state of the equipment.

First, the case in which control based on the control message is performed will be described with reference to FIG. 5.

Figure 5:
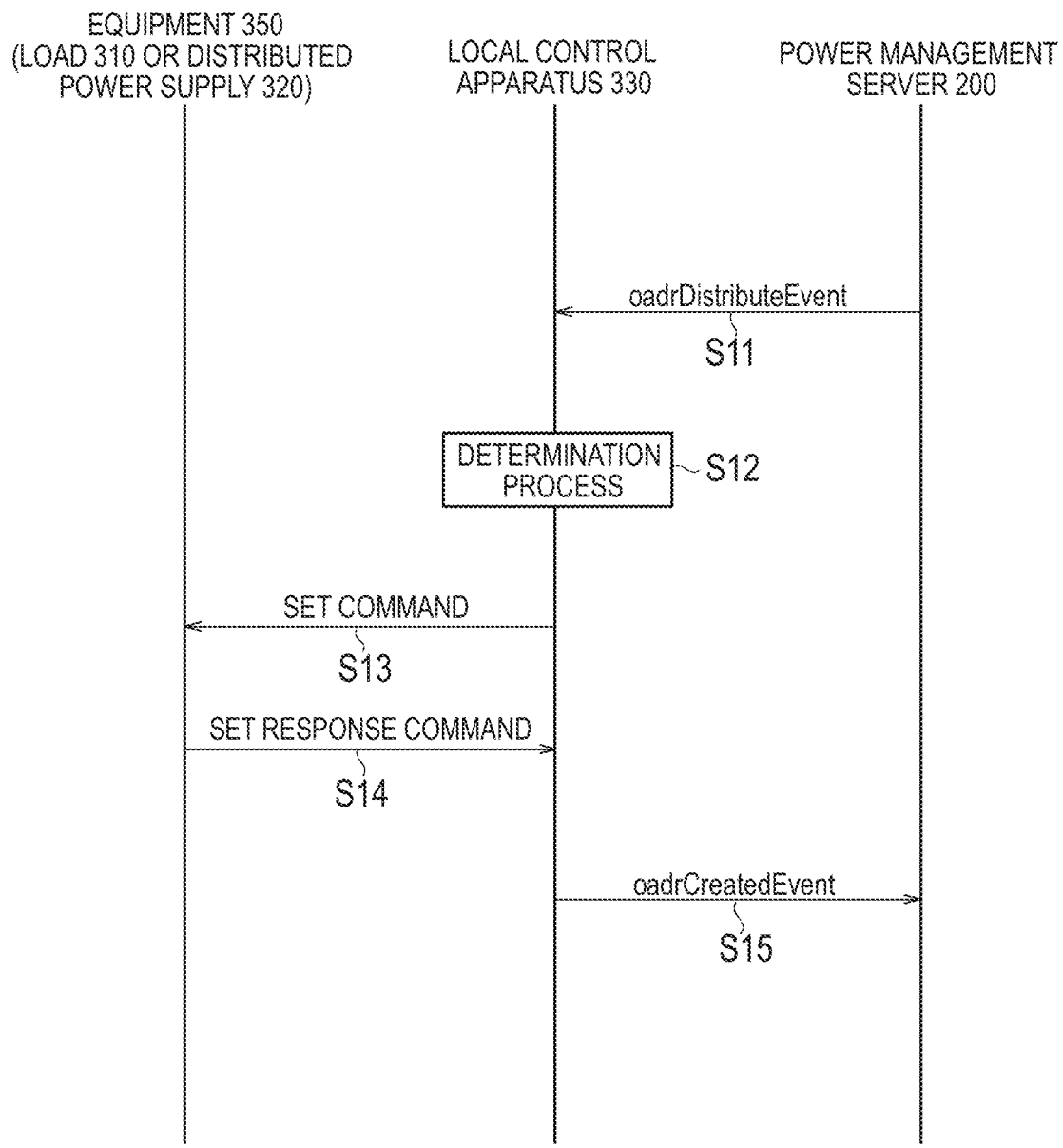
FIG. 5 is a diagram of a power management method according to an embodiment.

As shown in FIG. 5, in step S11, the power management server 200 sends oadrDistributeEvent to the local control apparatus 330 in conformance to the first protocol. oadrDistributeEvent is an example of the control message that instructs the setting of the operating state of the equipment.

In step S12, the local control apparatus 330 determines whether to perform on the basis of source identification information, control based on oadrDistributeEvent. For example, the local control apparatus 330 determines whether to perform on the basis of the priority level information, control based on oadrDistributeEvent (see FIG. 4).

In step S13, the local control apparatus 330 selects one or more local information elements that implement control instructed by oadrDistributeEvent from local information elements that the target equipment can cope with in conformance to the second protocol. The local control apparatus 330 sends a SET command the selected local information element to an equipment 350. The equipment 350 is the load 310 or the distributed power supply 320 provided on the facility 300.

In step S14, the local control apparatus 330 sends a SET response command for the SET command to the equipment 350.

In step S15, the local control apparatus 330 sends oadrCreatedEvent including the information element indicating that control based on oadrDistributeEvent is performed to the power management server 200. OadrCreatedEvent is the response to oadrDistributeEvent. OadrCreatedEvent may be sent before step S13.

Secondly, the case in which control based on the control message is not performed will be described with reference to FIG. 6. Processes in step S11 and step S12 are the same as the processes in FIG. 5, and the description is omitted.

Figure 6:
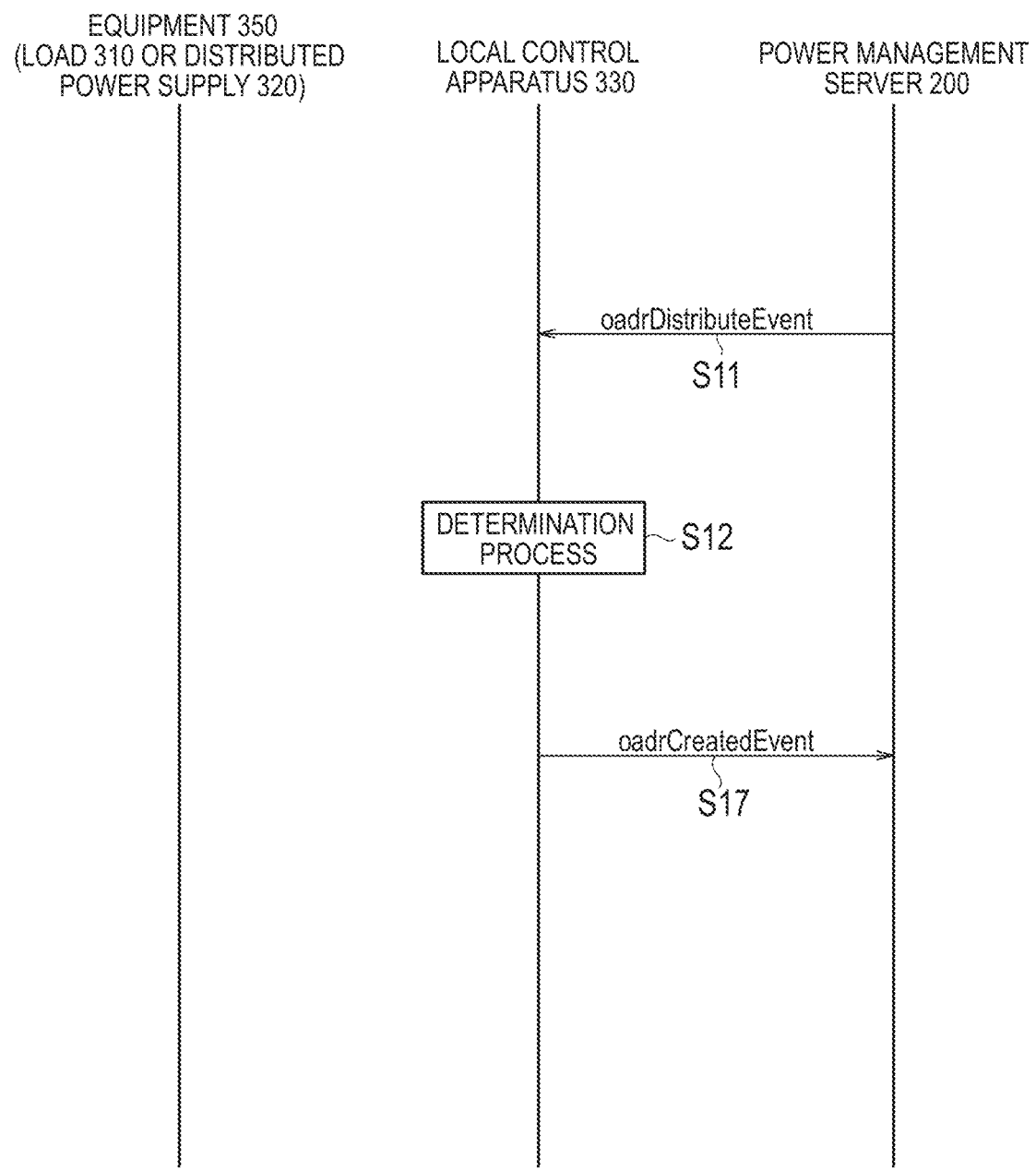
FIG. 6 is a diagram of a power management method according to an embodiment.

As shown in FIG. 6, in step S17, the local control apparatus 330 sends oadrCreatedEvent including the information element indicating that control based on oadrDistributeEvent is not performed to the power management server 200. The timing of sending oadrCreatedEvent may be the timing of determining that control based on oadrDistributeEvent is not performed, or may be the timing designated as the timing of performing control based on oadrDistributeEvent.

Modification 1

In the following, Modification 1 of the embodiment will be described. In the following, the differences from the embodiment will be mainly described.

In the embodiment, the case is described in which one control message is sent from the power management server 200 to the local control apparatus 330. In contrast to this, in Modification 1, the case will be described in which two or more control messages are sent from the power management server 200 to the local control apparatus 330.

For example, the case is considered in which the power management server 200 sends two control messages having different pieces of source identification information to the local control apparatus 330. In this case, when two control based on the two control messages contend with each other, the local control apparatus 330 performs the control based on the control message having a higher priority level. On the other hand, when the two control based on the two control messages do not contend with each other, the local control apparatus 330 may perform both of the two control based on the two control messages.

The case can also be considered in which the power management server 200 sends two control messages having the same source identification information to the local control apparatus 330. In this case, the local control apparatus 330 performs control based on the latest control message.

Power Management Method

In the following, the power management method according to the embodiment will be described. In the following, the case is shown as an example in which the first protocol is a protocol in conformance to Open ADR2.0 and the second protocol is a protocol in conformance to ECHONET Lite. The sequence relating to the case will be described in which the control content to the equipment instructed by the first message is the setting of the operating state of the equipment.

Figure 7:
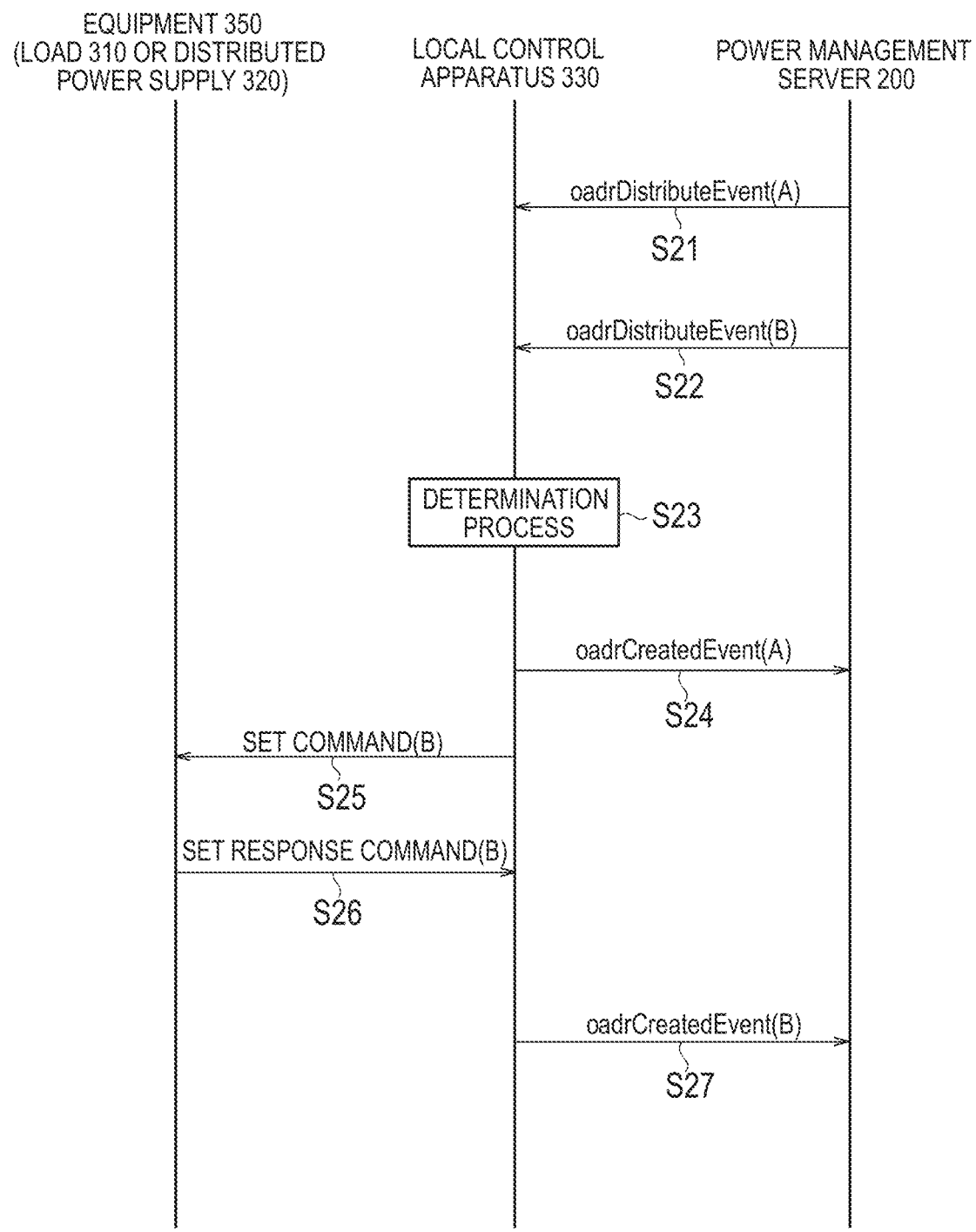
FIG. 7 is a diagram of a power management method according to a first modification.

As shown in FIG. 7, in step S21, the power management server 200 sends oadrDistributeEvent(A) in conformance to the first protocol to the local control apparatus 330. oadrDistributeEvent(A) is an example of a control message having a low priority level, for example.

In step S22, the power management server 200 sends oadrDistributeEvent(B) in conformance to the first protocol to the local control apparatus 330. oadrDistributeEvent(B) is an example of a control message having a higher priority level, for example.

In step S23, the local control apparatus 330 determines whether to perform on the basis of source identification information, control based on oadrDistributeEvent(A) and oadrDistributeEvent(B). For example, the local control apparatus 330 determines whether to perform on the basis of the priority level information associated with the source identification information (see FIG. 4), control based on oadrDistributeEvent(A) and oadrDistributeEvent(B).

Here, the local control apparatus 330 determines that control based on oadrDistributeEvent(B) is performed without performing control based on oadrDistributeEvent(A) because the priority level of oadrDistributeEvent(A) is lower than the priority level information of oadrDistributeEvent (B).

In step S24, the local control apparatus 330 sends oadrCreatedEvent(A) including the information element indicating that control based on oadrDistributeEvent(A) is not performed to the power management server 200. OadrCreatedEvent(A) is the response to oadrDistributeEvent(A). The timing of sending oadrCreatedEvent(A) may be the timing of determining that control based on oadrDistributeEvent(A) is not performed, or may be the timing designated as the timing of performing control based on oadrDistributeEvent(A). Note that the timing of determining that control based on oadrDistributeEvent(A) is not performed may be the timing at which oadrDistributeEvent(B) having a priority level higher than the priority level of oadrDistributeEvent(A) is received.

In step S25, the local control apparatus 330 selects one or more local information elements that implement control instructed by oadrDistributeEvent(B) from the local information elements that the target equipment can cope with in conformance to the second protocol. The local control apparatus 330 sends a SET command (B) including the selected local information element to the equipment 350.

In step S26, the equipment 350 sends a SET response command (B) to the SET command (B) to the local control apparatus 330.

In step S27, the local control apparatus 330 sends oadrCreatedEvent(B) including the information element indicating that control based on oadrDistributeEvent(B) is performed to the power management server 200. OadrCreatedEvent(B) is an response to oadrDistributeEvent (B). OadrCreatedEvent(B) may be sent before step S25.

Other Embodiments

The present invention is described using the foregoing embodiment. However, the description and the drawings that are parts of the disclosure should not be interpreted to limit the present invention. A variety of modifications, alterations, embodiments, and operating technologies will be apparent from the disclosure to a person skilled in the art.

In the embodiment, the case is shown as an example in which the first protocol is a protocol in conformance to Open ADR2.0 and the second protocol is a protocol in conformance to ECHONET Lite. However, the embodiment is not limited to this. The first protocol only has to be a protocol standardized as a protocol for use in the communication between the power management server 200 and the local control apparatus 330. The second protocol only has to be a protocol standardized as a protocol for use in the facility 300.

In the embodiment, the case is mainly described in which the control content to the equipment instructed by the first message is the setting of the operating state of the equipment. However, the embodiment is not limited to this. The control content to the equipment instructed by the first message may be the report of information on the equipment.

In the embodiment, the case is shown as an example in which the information element that specifies the use type is not defined by the first protocol. However, the embodiment is not limited to this. For example, the information element that specifies the source identification information associated with the use type may be newly defined by the first protocol, or the information element that specifies the use type may be newly defined by the first protocol.

Although not specifically described in the embodiment, the local control apparatus 330 provided on the facility 300 does not necessarily have to be provided in the facility 300. For example, a part of the function of the local control apparatus 330 may be offered from a cloud server provided on the Internet. That is, it may be considered that the local control apparatus 330 includes the cloud server. Alternatively, it may be considered that the cloud server is the power management server 200 having the foregoing relay controller 234.

Note that the entire content of Japanese Patent Application No. 2016-230453 (filed on Nov. 28, 2016) is incorporated by reference.

INDUSTRIAL APPLICABILITY

According to the embodiment, a power management method, a power management server, a local control apparatus, and a power management system that can appropriately control control content specified by a control message can be provided.

The invention claimed is:

1. A power management method, comprising:
sending a control message from one or more power management servers, configured to manage a facility connected to a power grid, to a local control apparatus provided on the facility, the control message including source identification information that identifies a source of the control message and not including a use type that identifies use of the control message; and
performing controls, by the local control apparatus, based on the control message and the source identification information,
wherein
the source identification information is associated with the use type, in a one-to-one correspondence,
the performing includes performing control based on a purpose indicated by the use type and associated, in the one-to-one correspondence, with the source identification information included in the control message,
the use type further indicates an issuer that plans for the performing the controls based on the control message, and
the purpose indicated by the use type includes at least one of control of a power flow rate from the power grid to the facility, control of a reverse power flow rate from the facility to the power grid, control of a distributed power supply provided on the facility, and control from a user related to the facility.

2. The power management method according to claim 1, further comprising:
managing, by the local control apparatus, information that associates priority level information with the source identification information, the priority level information indicating a priority level to perform the controls, wherein said performing the controls is further based on the priority level information.

3. The power management method according to claim 1, further comprising:
sending a notification, from the local control apparatus to the power management server, when the performing controls based on the control message is not performed.

4. The power management method according to claim 3, wherein the notification is sent at a timing of determining that the performing controls based on the control message is not performed, or at a timing that is designated for the performing controls based on the control message.

5. The power management method according to claim 1, wherein communication between the one or more power management servers and the local control apparatus is performed in conformance to a predetermined protocol.

6. The power management method according to claim 5, wherein a message format in conformance to the predetermined protocol includes an information element that specifies control content to the local control apparatus, and does not include an information element that specifies the use type.

7. A power management server configured to manage a facility connected to a power grid, the server comprising:
a transmitter configured to send a control message to a local control apparatus provided on the facility, the control message including source identification information that identifies a source of the control message and not including a use type that identifies use of the control message,
wherein
the source identification information of the control message is associated with the use type, in a one-to-one correspondence,
the transmitter is configured to send the control message to the local control apparatus to cause the local controller apparatus to perform control based on a purpose indicated by the use type and associated, in the one-to-one correspondence, with the source identification information included in the control message,
the use type further indicates an issuer that plans for performing the control based on the control message, and
the purpose indicated by the use type includes at least one of control of a power flow rate from the power grid to the facility, control of a reverse power flow rate from the facility to the power grid, control of a distributed power supply provided on the facility, and control from a user related to the facility.

8. A local control apparatus provided on a facility connected to a power grid, the local control apparatus comprising:
a receiver configured to receive a control message from a power management server configured to manage the facility, the control message including source identification information that identifies a source of the control message and not including a use type that identifies use of the control message; and
a controller configured to perform controls, based on the control message and the source identification information,
wherein
the source identification information is associated with the use type, in a one-to-one correspondence,
the controller is configured to perform control, among the controls, based on a purpose indicated by the user type and associated, in the one-to-one correspondence, with the source identification information included in the control message, the use type further indicates an issuer that plans for performing the controls based on the control message, and the purpose indicated by the use type includes at least one of control of a power flow rate from the power grid to the facility, control of a reverse power flow rate from the facility to the power grid, control of a distributed power supply provided on the facility, and control from a user related to the facility.

9. A power management system, comprising:

a power management server configured to manage a facility connected to a power grid, the power management server comprising a transmitter configured to send a control message to a local control apparatus, the control message including source identification information that identifies a source of the control message and not including a use type that identifies use of the control message; and the local control apparatus provided on the facility, the local apparatus comprising a controller configured to perform controls, based on the control message and the source identification information, wherein the source identification information is associated with the use type, in a one-to-one correspondence, the controller is configured to perform control, among the controls, based on a purpose indicated by the user type and associated, in the one-to-one correspondence, with the source identification information included in the control message, the use type further indicates an issuer that plans for performing the controls based on the control message, and the purpose indicated by the use type includes at least one of control of a power flow rate from the power grid to the facility, control of a reverse power flow rate from the facility to the power grid, control of a distributed power supply provided on the facility, and control from a user related to the facility.

* * * * *